United States Patent [19]

Michaels et al.

[11] 4,292,227
[45] Sep. 29, 1981

[54] STABLE SUPERSATURATED SOLUTIONS OF SPARINGLY SOLUBLE SALTS

[75] Inventors: Alan S. Michaels, San Francisco; Michael W. Weiner, Stanford, both of Calif.; Hemant Jalan, Chicago, Ill.

[73] Assignee: Board of Trustees of Leland Stanford Junior University, Stanford, Calif.

[21] Appl. No.: 102,215

[22] Filed: Dec. 10, 1979

[51] Int. Cl.$^3$ ..................... B01D 11/04; B01D 13/00
[52] U.S. Cl. .................. 260/29.6 H; 210/646; 210/647; 423/422; 424/128; 252/182
[58] Field of Search ............... 252/182; 210/646, 647; 423/422; 424/128, 313, 362, 365; 260/29.6 H

[56] References Cited

U.S. PATENT DOCUMENTS 4,075,108  2/1978  Higley et al. ..................... 210/646
4,202,760  5/1980  Storey et al. ..................... 210/647

Primary Examiner—Richard E. Schafer
Assistant Examiner—Irwin Gluck
Attorney, Agent, or Firm—Bertram I. Rowland

[57] ABSTRACT

Method and compositions are provided concerning stable supersaturated aqueous solutions of sparingly soluble inorganic salts. The method involves exceeding the solubility level of a sparingly soluable inorganic salt in water at ambient temperatures in the presence of polyanionic polyelectrolyte having a molecular weight of at least about 900 daltons and an ionic equivalent weight of not greater than about 65 and at least five ionizable groups per molecule. The solubility level may be exceeded by cooling a saturated solution of the sparingly soluble salt, preparing the sparingly soluble salt in situ, or adding a soluble salt having a common ion with the sparingly soluble salt to a concentrated or saturated solution of the sparingly soluble salt.

14 Claims, No Drawings

STABLE SUPERSATURATED SOLUTIONS OF SPARINGLY SOLUBLE SALTS

BACKGROUND OF THE INVENTION

1. Field of the Invention

There are many situations where it is desirable to have a highly concentrated aqueous solution of a sparingly soluble inorganic salt. Such solutions find particular application where a metered addition of the inorganic salt is required within relatively narrow concentration limits, the metered solution being used directly or diluted. An excellent illustration of this situation is a hemodialysis system, where it is desirable to ship the preformed salt solutions at high concentration to minimize the cost of handling and shipment. The hemodialysis unit can then monitor the dilution of the concentrate to provide the necessary salt concentration in the dialysis unit. Other situations where supersaturated aqueous solutions might find use are carbonates in fire extinguishers, preparation of crystals of enhanced size, and in chemical reactions.

Enhanced concentrations of sodium bicarbonate, beyond the solubility limits at ambient temperatures, are of particular interest for hemodialysis. While bicarbonate has always been recognized as the normal physiologic buffer-anion for control of blood pH, its utilization as a component of dialysate in extracorporeal hemodialysis has been confounded by solubility problems peculiar to aqueous solutions of sodium bicarbonate containing other electrolytes required to maintain isotonicity with blood plasma and by the instability of dissolved bicarbonate to changes in pH and carbon dioxide tension. There has therefore been substantial efforts in this field to develop concentrate solutions which can find acceptance in a hemodialysis unit, while providing the desired high concentration for preparation and shipment.

2. Brief Description of the Prior Art

Van Wager, J. R., "Phosphorus and Its Compounds," Vol. II, Interscience Publishers, New York (1961) gives a general description of utilities for polyphosphates.

SUMMARY OF THE INVENTION

Compositions and their method of preparation are provided, wherein the compositions are storage stable supersaturated aqueous solutions of sparingly soluble salts, particularly alkali metal salts. The compositions are prepared in the presence of a polyelectrolyte of at least about 900 daltons, the electrolyte having an ionic equivalent weight of at least about 65 and at least five anionic groups per molecule. The compositions find particular use as concentrates of a source of the inorganic salt, which may be used directly or diluted in a continuous manner to a predetermined concentration. In addition, the subject compositions find application as enhanced sources of carbon dioxide and as a means for enhancing crystal growth.

DESCRIPTION OF THE SPECIFIC EMBODIMENTS

The subject invention provides for the formation of supersaturated solutions of inorganic salts, particularly alkali metal salts, which are sparingly soluble in water. The supersaturated solutions are formed by crossing beyond the saturation point of the sparingly soluble salt in the aqueous medium in the presence of a polyanionic polyelectrolyte. Crossing the saturation level to a supersaturated level can be as a result of dissolving the salt at a temperature where it is soluble, preferably at a relatively mildly elevated temperature (usually less than about 65° C.) and then cooling the solution past saturation; forming the salt in situ by metathesis or neutralization between an acid and a base, that is, providing the ions of the salt from two different sources; or adding to a solution of the sparingly soluble salt, a more soluble salt having a common ion with the soluble salt. In each instance, a solution of the salt is provided, where the saturation limit of the salt in the solution is exceeded in the presence of a polyanionic polyelectrolyte. The resulting solutions are then stable for long periods of time, particularly storage stable under varying conditions of temperature. Relatively small amounts of the polyelectrolyte are employed.

The sparingly soluble salts are alkali metal, more particularly sodium. The anions will normally be derived from carbonic acid, particularly carbonate and bicarbonate, although other anions which form sparingly soluble salts may also find use. The sparingly soluble salts will generally have a solubility of less than about 10 g/100 ml at ambient temperature ($\sim 20°$ C.).

The polyelectrolyte will be at least about 900 daltons, more usually at least about 1,000 daltons, and should be relatively stable under the conditions of formation of the supersaturated solution and on standing. The polyelectrolyte will be water soluble, may be organic or inorganic, and will frequently be a polymer, having a monomer which is singly or doubly charged, particularly a negatively charged (anionic) unit.

Anionic functionalities include phosphate, phosphonate, sulfate, sulfonate, and carboxylate. Of particular interest are the weaker acids, such as polyphosphate and polycarboxylate. Various anionic monomers include phosphate, acrylate, maleate, methacrylate, vinyl carboxymethyl ether, or the like. The monomers may be homopolymerized or copolymerized, the organic monomers normally being copolymerized with a wide variety of hydrocarbon or heterosubstituted ethylenic monomers. The neutral monomers will normally be of from two to six, usually two to four carbon atoms, having from one to three, usually one to two heteroatoms which are oxygen, particularly oxy and oxo, both carbonyl oxo and carboxyl non-oxo-carbonyl.

Illustrative neutral monomers for copolymerization include methyl acrylate, methyl vinyl ether, hydroxyethyl acrylate, ethylene, vinyl acetate, etc.

Inorganic polyelectrolytes include polyphosphates, particularly polyphosphates having at least about nine phosphate groups, preferably at least about twelve phosphate groups and less than about 100 phosphate groups, preferably about 20 to 30 phosphate groups.

The charge density or ionic equivalent weight should be less than about 500, usually less than about 400, and generally greater than about 65, usually greater than about 70. The molecular weight of the polyelectrolyte will generally be at least about 900, usually greater than about 1,000, and less than about 500,000, more usually less than about 200,000, preferably from about 10,000 to 100,000.

Specific polyelectrolytes include:

---

(1) Drew 9-041          Drew Chemicals Co.
    polyacrylic acid $\sim 2000$ mw
    Colloid X-H1          Stauffer Chem. Co.
    sulfated cellulose

| -continued | |
|---|---|
| Calgon | Stauffer Chem. Co. |
| Na hexametaphosphate (n = 13) | |
| Carboxyl 94 | B.F. Goodrich Co. |
| polyacrylic acid m.w. ~$10^6$ | |
| Gantrez AN-119 | GAF Corp. |
| low mw copolymer of methyl vinyl ether and maleic anhydride | |
| Gantrez AN-139 | GAF Corp. |
| medium mw copolymer of methyl vinyl ether and maleic anhydride | |
| Gantrez AN-163 | GAF Corp. |
| high mw copolymer of methyl vinyl ether and maleic anhydride | |
| potassium polymetaphosphate n = 5K — 10K | |
| sodium polymetaphosphate n≧61 | |

In addition to the sparingly soluble salt, other soluble salts may be present, such as sodium chloride, potassium chloride, lithium chloride, and the like. It should be appreciated, that due to the common ion effect, large amounts of salts which have a common ion with the sparingly soluble salt, will further effect a reduction in the dispersability of the sparingly soluble salt.

The amount of the various materials will vary, depending upon the particular salt. Usually, the concentration of the supersaturated sparingly soluble salt will be at least 50% greater than the saturation solubility at ambient temperature, usually at least 100% greater than the saturation solubility at ambient temperature and may be as high as 150% greater or more.

The concentration of the polyelectrolyte will be the minimum amount necessary to provide the desired stability, generally being not less than about 0.1 g/l., generally ranging from about 0.1 to 5 g/l., more usually ranging from about 0.5 to 3 g/l. and frequently being from about 0.75 to 2 g/l.

Of particular interest are concentrates of sodium bicarbonate for use in hemodialysis units. The solutions will have at least about 20, usually 25 times the concentration required for the hemodialysis unit, generally being at least about 0.70 eq/l., usually 0.875 eq/l., and may be up to 1 eq/l. or greater. The concentration of the polyelectrolyte will be at least about 0.25 g/l., usually at least about 0.5 g/l, preferably at least about 1 g/l., and not exceeding 5 g/l., more usually not exceeding 3 g/l.

In addition to the stabilizing agents and sodium bicarbonate, other salts may be present, particularly sodium chloride, which at 25 fold dilution will be 2.5 eq/l. and potassium chloride, at 25 meq/l. So far as the weight of the individual materials, the sodium bicarbonate will be about 73.5 g/l., the sodium chloride about 146.3 g/l. and the potassium chloride about 1.9 g/l. The polyelectrolyte will be about 0.75 to 1.5 g/l. usually about 1 g/l. The pH of the solution will generally be from about 8 to 8.5, usually about 8.3. Besides the alkali metal halides, magnesium chloride may also be present, which at 25 fold dilution will be 14 meq/l, and about 0.14 g/l.

When the bicarbonate concentrate is employed with a separate Ca/Mg concentrate, the Ca/Mg concentrate can provide for the desired pH of the final solution, a pH generally about 7 to 7.5, preferably 7.2.

Of particular interest as the polyelectrolyte are the various polyphosphates, particularly sodium hexametaphosphate, potassium polymetaphosphate and sodium polymetaphosphate.

In order to demonstrate the subject invention, sodium bicarbonate solutions for use in a hemodialysis unit were studied as illustrative of the subject invention.

Sample solutions were prepared as follows. A stock solution of $NaHCO_3$ (0.875 g. mol $NaHCO_3$ dissolved in 910 ml water to yield 950 ml solution) was prepared. To 95 ml of the $NaHCO_3$ solution was added 0.1 g of additive (pH adjusted to within the 7.0-7.5 range if the additive initially exhibited some other pH) followed by the addition of 0.25 gm mol NaCl to yield 100 ml of a 25× concentrate.

Various polyelectrolytes were employed in preparing solutions in a manner analogous to that described above. Particularly hexaphos, Graham's salt (sodium polymetaphosphate n>61) and Gantrez AN-119.

The phosphate solutions show virtually complete stability to precipitation on ageing at ambient temperature for periods of ca 8 weeks, as well as to cyclic heating and cooling between 4° C. and 45° C. for periods of up to 5 weeks. Based on earlier experiments Gantrez AN-119 would be expected to perform comparably.

The utilization of the bicarbonate concentrate for hemodialysis was tested by using an in vitro dialysis against a "blood like" salt solution. The following is a description of the materials, the procedure and the results. Materials:

(1) Single Batch Bicarbonate Concentrate (25 X) (SBBC)

| Wgt., gm/l | Substance | mEq/l (after dilution) |
|---|---|---|
| 146.3 | NaCl | 100 |
| 73.5 | Na $HCO_3$ | 35 |
| 8.61 | Ca Acetate | 4 (ideal) |
| 3.0 | Xanthan | — |
| 1.0 | Hexaphos | — |
| 1.88 | KCl | 1.0 |
| 2.55 | $MgCl_2 . 6H_2O$ | 1.0 |

(2) Blood-Like Salt Solution ("Blood")

| Wgt., gm/l | Substance | mEq/l |
|---|---|---|
| 6.72 | NaCl | 115.0 |
| 1.68 | $NaHCO_3$ | 20.0 |
| 0.166 | $CaCl_2$ | 3.0 |

Temperature 37° C.; bubbled with 5% $CO_2$.
(3) Cobe Century II AFM Dialysis Control Unit
(4) Cordis Dow C-DAK 1.8 D Artificial Kidney
Methods: Procedure for Dialysis
(1) The SBBC was prepared the day of the experiment and used within 6 hours after preparation. The NaCl, $NaHCO_3$, KCl, MgCl, and Hexaphos were dissolved in approximately 800 cc of R. O. Water, with continued mixing and slight heating. Xanthan was then homogenized into solution and the volume checked. (The xanthan was subsequently found to be superfluous and possibly detrimental). The water needed to bring this volume up to 1 liter (≈500 cc) was used to dissolve the Ca Acetate which was then added to the concentrate under mild homogenation.
(2) The Century II was set up in the usual manner, with the substitution of the SBBC for the routine acetate concentrate. The outflowing dialysate was checked for Na concentration after the conductivity reached the proper range (Na+ =137.4 mEq/l).

(3) The C-DAK 1.8 kidney was connected, flushed and primed with normal saline.

(4) The arterial line was connected to the "blood" solution which was kept at a temperature of 37° C. and gassed with 5% $CO_2$ to maintain a $pCO_2$ of around 30 mmHg.

(5) The dialysis was started and the transmembrane pressure (TMP) adjusted to zero. The system was allowed to run undisturbed for ten minutes to allow for stabilization.

(6) After the stabilization period, the "blood" outflow ($Q_{Bo}$) and the dialysate outflow ($Q_{Do}$) were measured with a timed collection by volume. Samples were collected in the following order: dialysate outflow ($D_o$), "blood" outflow ($B_o$), dialysate inflow ($D_i$) and "blood" inflow ($B_i$). The samples were then placed in evacuated glass tubes until analysis. All analysis except total Ca and ortho phosphate were completed within 6 hours of collection.

(7) The TMP was changed to -200 mmHg and after a 10 minute stabilization period, the above procedure (#6) was repeated.

Methods: Analytical
(1) pH by electrode
(2) Total $CO_2$ by Infrared method
(3) $HCO^-_3$, $pCO_2$ calculated from #1 and #2 using the Henderson-Hasselbach equation
(4) $Ca^{+2}$ (ionic) by electrode (Orion)
(5) $Ca^{+2}$ (total) by atomic absorption (Clinical Lab)
(6) Ortho phosphate ($H_2PO_4^-$) free and total (after 30 minutes of acid hydrolysis at 200° C. to break all linear phosphate polymers to ortho phosphate) was determined using the Fish-Subba-Rew-Summer reaction.

Comments:
1. Bicarbonate transfer at a mean of 90 mEq/hr. into the patient would be a maximum rate with this size kidney and blood flow. There is a significant drop by approximately 10–15% in bicarbonate transfer to the patient when a TMP of -200 mmHg is added.
2. There is a mean net Ca loss of 3.5 mEq/hr. and there seems to be no effect of negative pressure. This would be a maximum rate of loss. The other complicating factor in $Ca^{+2}$ transfer is the high pH (8.3) of the returning (post kidney) "blood". With this there is a 20–30% decrease in ionic $Ca^{+2}$. However, the physiologic effect of this, if any, could only be evaluated in an in vitro system. The total phosphate transfer to the "blood" from the hexaphos in the dialysate is minimal, 0.75 mmols (75 mg) per hour. This number is an artifact since the "blood" in our in vitro system contains no phosphate. The blood of a person with end stage renal disease contains high phosphate levels (0.5 to 1.0 mmols/l) and would result in the net transfer of phosphate from patient to dialysate.

TABLE 3a

Analyses of "Blood" and Dialysate-Dialysis Run 1

Results:
(1) TMP = 0 Blood Flow ($Q_B$) = 194 ml/min
Dialysate Flow ($Q_d$) = 580 ml/min

| | Blood Side | | Dialysate Side | |
|---|---|---|---|---|
| | $B_{in}$ | $B_{out}$ | $D_{in}$ | $D_{out}$ |
| pH (units) | 7.49 | 8.34 | 8.65 | 8.59 |
| Total $CO_2$ (mEq/l) | 19.75 | 26.50 | 31.75 | 28.82 |
| $pCO_2$ (mmHg) | 29.04 | 3.20 | 2.97 | 3.10 |
| $HCO_3^-$ (mEq/l) | 18.88 | 26.40 | 31.66 | 28.73 |
| $Ca^{+2}$ ionic (mEq/l) | 2.51 | 2.04 | 2.18 | 2.45 |
| $Ca^{+2}$ total (mEq/l) | 2.64 | 2.54 | 3.79 | 4.0 |
| $PO_4$ (Free) (mmols/l) | 0 | .005 | 0.05 | .03 |
| $PO_4$ total (mmols/l) | .005 | .03 | .43 | .40 |

TABLE 3b

Analyses of "Blood" and Dialysate-Dialysis Run 2

Results:
(2) TMP = 0   ($Q_B$) = 184   $Q_D$ = 590

| | Blood Side | | Dialysate Side | |
|---|---|---|---|---|
| | $B_{in}$ | $B_{out}$ | $D_{in}$ | $D_{out}$ |
| pH (units) | 7.49 | 8.34 | 8.67 | 8.60 |
| Total $CO_2$ (mEq/l) | 20.59 | 27.40 | 32.90 | 29.63 |
| $pCO_2$ (mmHg) | 29.72 | 5.27 | 2.79 | 3.14 |
| $HCO_3$ (mEq/l) | 19.62 | 27.25 | 32.81 | 29.54 |
| $Ca^{+2}$ ionic (mEq/l) | 2.42 | 1.70 | 1.82 | 2.02 |
| $Ca^{+2}$ total (mEq/l) | 2.59 | 2.54 | 3.94 | 4.0 |
| $PO_4^=$ (Free) (mmols/l) | 0 | 0 | .04 | .03 |
| $PO_4^=$ total (mmols/l) | 0 | .05 | .44 | .40 |

TABLE 3c

Net Transfer of Principal Solutes During Dialysis

| | | Blood Side | Dialysate Side |
|---|---|---|---|
| Run #1: | Total $CO_2$ | +78.5 mmol/hr | -102 mmol/hr |
| $Q_B$ = 194 | $HCO_3$ | +87.5 mEq/hr | -101 mEq/hr |
| $Q_D$ = 580 | Total $Ca^{++}$ | -1.2 mEq/hr | +7.3 mEq/hr |
| | Total ($PO_4$) | +0.3 mmol/hr | -1.0 mmol/hr |
| Run #2 | Total $CO_2$ | +75.0 mmol/hr | -115 mmol/hr |
| $Q_B$ = 184 | $HCO_3^-$ | +84.2 mEq/hr | -116 mEq/hr |
| $Q_D$ = 590 | Total $Ca^{++}$ | 0.6 mEq/hr | +2.1 mEq/hr |
| | Total ($PO_4$) | +0.6 mmol/hr | -1.4 mmol/hr |

Two solutions could be prepared for use in a hemodialysis unit. One solution "A" would be the sodium bicarbonate concentrate while the other solution "B" would be a Ca/Mg concentrate. The following would be the solution compositions:

| | g/l. |
|---|---|
| "A" | |
| $NaHCO_3$ | 73.5 |
| NaCl | 146.3 |
| Hexaphos | 1.0 |
| Water to make | 11 |
| "B" | |
| Calcium acetate . $H_2O$ | 176 |
| $MgCl_2$ . $6H_2O$ | 51 |

-continued

| | g/l. |
|---|---|
| KCl* | 37.5 |
| Acetic acid (glac.) | 135 |
| Water to make ~700ml | |

*KCl could be included in solutions A or B or both

The preparation of the two solution concentrates is outlined below:

(A) Solution A (25×Sodium Bicarbonate/Sodium Chloride Concentrate)—10 Liter Batch
 (1) Transfer 9.0 liters of distilled, deionized, warm (35° C.) water to a 15-liter stainless steel or glass vessel equipped with a propeller-agitator.
 (2) Add to (1), with mild agitation, 10.0 grams Hexaphos (Food Grade); when completely dissolved, add 735 grams sodium bicarbonate (C.P. or USP). Continue agitation until solution is clear and no solid remains.
 (3) With continued mild agitation, slowly sift into the solution of (2) 1463 grams of sodium chloride (USP), allowing sufficient time between successive additions to permit dissolution of the salt. When addition is complete, continue agitation for 10-15 minutes to insure complete solution.
 (4) Adjust solution-volume to exactly 10 liters by addition of distilled water.
 (5) Filter the solution by gravity through a qualitative-grade paper filter into a glass carboy, and seal tightly. Allow to stand undisturbed for about 24 hours. Then pressure-filter the solution through a sterilizing (0.2 micron) membrane filter (Millipore or equivalent) and transfer to sealable one-liter glass or plastic containers.

(B) Solution B (Acidified Ca/Mg/K Concentrate)—One Liter Batch
 (1) Place 500 ml of warm (35° C.) distilled, deionized water in a two-liter glass or stainless steel vessel equipped with a propeller-agitator. Add, with gentle stirring, 135 grams of glacial acetic acid.
 (2) Add consecutively to (1), with mild agitation, 176 grams calcium acetate monohydrate, (USP) 51 grams magnesium chloride hexahydrate, (USP) and 37.5 grams potassium chloride (USP). Continue agitation until solution is clear, and then bring volume to exactly 1.0 liter with distilled water.
 (3) Filter the solution through a qualitative grade paper filter into a glass bottle, and seal tightly. Allow to stand undisturbed for about 24 hours. Then pressure-filter the solution through a sterilizing (0.2 micron) membrane filter, and transfer to sealable 50 ml glass vials.

The process of combining Solution A (1 liter), Solution B (50 ml), and water (24 liters) to yield 25 liters of dialysate of proper composition can be accomplished by two alternative procedures:

(1) Solution A can be continuously mixed with water in the required 24:1 ratio, and Solution B metered into this mixture in the desired ratio of 2 ml per liter of dialysate, or
(2) Solution B can be continuously mixed with water in the ratio of 1 ml/4.8 liters water, and this solution then mixed continuously with Solution A in the desired ratio of 1 liter A per 24 liters water/B mixture.

Of the two alternatives proposed, the second is to be preferred for two principal reasons: Firstly, predilution of the acidic B-concentrate with water will eliminate local large excursion in pH and calcium-ion concentration due to mixing-inhomogeneities, and thus minimize the likelihood of $CO_2$-loss and calcium carbonate precipitation. Secondly, automatic conductivity-control of the mixing ratio of Solution A and the Water/B premix will be quite sensitive and accurate, since the contribution of the ionic components of Solution B to the total conductivity of the final diluted dialysate is very small; hence, the precision of the mixing ratio of Solution A with the bulk of the dialysate (if controlled by conductivity) will be high irrespective of variations in the ratio of B to water in the premix.

Thus the existing delivery system provided by the commercially available Cobe Century II unit is adequate for the delivery of fully-constituted bicarbonate dialysate, with a means (either by incorporation within or addition to the system) for volumetrically metering Solution B into the water fed to the system, in a roughly 1:5000 ratio. This could be accomplished, for example, by (1) delivering B-concentrate via a motor-driven syringe-pump through a capillary-tubing feed-line to the water-supply inlet; or (2) ganging water- and concentrate-tubing pumps together via a common drive and gear-reduction train, so that the ratio of volumetric deliveries of the two fluids is maintained at the desired value. Other techniques of metering the fluid at a very low flow rate into another flowing at a much higher rate may also be feasible. High precision in control of the mixing ratio of Solution B with feed-water is not required, since the only component-concentrations in the final dialysate which depend on this ratio are the minor components: calcium, magnesium, potassium, and hydrogen ion. Moreover, because of the strong buffering capacity of the bicarbonate present in solution, the pH of the final dialysate will be quite insensitive to variations in the amount of acid added. For example, doubling the mixing ratio of Solution B to water would cause the $Ca^{++}$ ion concentration to rise from 4.0 to 8.0 mEq/l, $Mg^{++}$ and $K^+$ from 1.0 to 2.0 mEq/l, and the pH to drop from 7.2 to 6.9. Thus, even a 50 percent variability in the mixing ratio would yield a final dialysate of physiologically acceptable composition, with little to no attendant risk to the patient.

In accordance with the subject invention, concentrates are provided which are stable for long periods of time. Sodium bicarbonate concentrates find particular use in hemodialysis, allowing for the shipment of relatively low volumes of the sodium bicarbonate, which may then be automatically diluted into a hemodialysis unit to provide for the necessary carbon dioxide concentration. Furthermore, the bicarbonate solutions have long shelf lives. Under conditions which stress the stability of the solutions, the solutions are stable for extended periods of time.

In addition, the subject invention, provides a convenient method for preparing stable supersaturated solutions by using either a single or combination of reagents which inhibit the precipitation of solids. Alternatively, one can provide for highly supersaturated solutions of salts, so as to modify the crystal properties of a precipitate.

Although the foregoing invention has been described in some detail by way of illustration and example for purposes of clarity of understanding, it will be obvious that certain changes and modifications may be practiced within the scope of the appended claims.

What is claimed is:

1. A method for preparing supersaturated aqueous solutions of sparingly soluble inorganic salts of alkali metals, said method comprising:

forming a supersaturated solution of said sparingly soluble inorganic salt in an aqueous medium, wherein the saturation limit of said salt is exceeded in said aqueous medium in the presence of a polyanionic polyelectrolyte present in said solution in sufficient amount to stabilize said sparingly soluble salt in solution, said polyelectrolyte being of at least about 900 daltons and having at least five ionizable groups.

2. A method according to claim 1, wherein said polyelectrolyte is present in from about 0.5 to 5 g/l.

3. A method according to claim 2, wherein said polyelectrolyte is a polyphosphate.

4. A method according to claim 2, wherein said polyelectrolyte is a polycarboxylate.

5. A method according to claim 1, wherein said salt is dissolved at an elevated temperature, and said saturation limit of said salt is exceeded by cooling.

6. A method according to claim 1, wherein said salt is prepared in situ.

7. A method according to claim 1, wherein said saturation limit of said salt is exceeded by the addition of a soluble salt having a common ion with said sparingly soluble salt.

8. A method for preparing a sodium bicarbonate concentrate, said method comprising:

dissolving sodium bicarbonate in water in an amount greater than at least about 50% greater than the saturation solubility at ambient temperature of said sodium bicarbonate in the presence of a polyelectrolyte at a concentration in the range of about 0.5 to 5 g/l., said polyelectrolyte having a molecular weight of at least about 900 daltons and having at least five ionizable groups to provide negative charges.

9. A method according to claim 5, which includes the step of dissolving sodium chloride in said solution.

10. A method according to any of claims 5 or 6, wherein said polyelectrolyte is a polyphosphate having at least nine phosphate groups.

11. A method according to any of claims 5 or 6, wherein said polyelectrolyte is an addition polymer polycarboxylate.

12. A composition prepared by the method of claim 3.

13. A composition prepared by the method of claim 4.

14. A composition prepared by the method of claim 9.

* * * * *